May 28, 1963 T. F. McHENRY 3,091,690
TWO PATH INFRARED GAS ANALYZER HAVING ONE ENCLOSED PATH
Filed June 16, 1960 2 Sheets-Sheet 1

INVENTOR.
THOMAS F. MCHENRY
BY
ATTORNEY

INVENTOR.
THOMAS F. MCHENRY
BY
ATTORNEY

United States Patent Office 3,091,690
Patented May 28, 1963

3,091,690
TWO PATH INFRARED GAS ANALYZER HAVING ONE ENCLOSED PATH
Thomas F. McHenry, South Norwalk, Conn., assignor to Barnes Engineering Company, Stamford, Conn., a corporation of Delaware
Filed June 16, 1960, Ser. No. 36,532
10 Claims. (Cl. 250—43.5)

The invention relates to an extremely rugged, simple and sensitive instrument for gas analysis using infrared radiations.

In the past many instruments have been designed for gas analysis by infrared radiation at different wavelengths. When a wavelength is chosen in which a given constituent of the gas, or one the presence of which is to be detected, absorbs strongly it is possible either to analyze for its concentration or to actuate a warning when the constituent reaches a predetermined concentration. These instruments have given acceptable service in the laboratory where they can be cared for by highly skilled personnel, a constant environment provided and where weight and bulk are minor considerations. However, the instruments are sensitive to change in radiation of the infrared source used, changes in infrared detector sensitivity and other factors such as mechanical shocks and the like. As a result highly sensitive rugged infrared gas analyzers and detectors have not been available for use in unfavorable industrial environment or in the field.

The disadvantages of the instruments previously used are completely avoided in the instruments of the present invention. The instruments include a source of infrared radiation which may be a Nernst glower, incandescent bulbs with conically wound filaments or any other suitable source of infrared radiation. The radiations from the source are then directed by suitable optics, which may be dioptric or catoptric, through two paths. Preferably the optics also collimate the rays. One of the paths is enclosed and contains a gaseous mixture free from any of the components which it is desired to detect or the concentration of which it is desired to measure. The other path encounters the same gas in which the component to be detected or measured may be present. For many uses such as the detection of small amounts of undesired gases in air the gaseous mixture itself is air and so the path in which the constituent may be present is simply an open path exposed to the atmosphere. Windows are, of course, provided of material suitable for transmission of the infrared bands employed. These windows keep the enclosed path isolated from the atmosphere or the other path so that it always presents a comparison gaseous path in which there is none of the constituent to be detected.

The beams, after passing through the two paths, are then passed through two filters determining different infrared bands in one of which the substance to be detected has a strong absorption. These filtered beams are imaged on a suitable infrared detector, for example, a thermistor bolometer. Clopping means are provided so that first one filter is in one path and the other in the other and the situation is then reversed. This is easily effected either by a rotating filter chopper with two segments of different filter material or by fixed filters and means for rotating the beams from the different paths. The output from the detector is amplified at chopping frequency and the amplified signal can then actuate meters, recorders, alarms or any other suitable devices of conventional design. The instrument is calibrated so that the output signal is zero if there is none of the constituent to be detected in either path. In the further description one of the paths will be referred to as enclosed and the other as exposed. Of course, if the instrument is to be used in connection with gaseous atmospheres other than the air the exposed path will have to be enclosed and some means provided for circulating therethrough the gaseous medium which may contain the constituent to be detected or measured.

The AC signal at chopping frequency may be expressed as follows.

$$S = B(T_{P1}A_1 - T_{P2}A_2)(T_1 - T_2)$$

Where S equals the A.C. signal, B is the source intensity, $T_1$ and $T_2$ are the transmissions of the two filters. $T_{P1}$ and $T_{P2}$ are the transmissions of the two paths and $A_1$ and $A_2$ are the cross sections of the two paths. Calibration is effected by having none of the constituent to be detected in the exposed path. In the case of air instruments this means that the exposed path and the enclosed path contain the same atmosphere. In such a case, of course, the transmissions for the two path lengths are equal and are equal to one. The cross sections of the paths are then adjusted so that they are equal and then the filters are adjusted so that they are also equal. This can be done by suitable graying of the filter having higher transmission, for example, by uniform stippling with an opaque paint or by the insertion of a neutral grey wedge or by any other known means. Once these two calibrations have been made the output signal can be represented by the following equation.

$$S = B(A_1 - A_2)(T_1 - T_2)$$

As long as the cross sections of the two paths remain the same, and this is mechanically simple to provide because the small fine adjustment which may be necessary can be locked in position, the most important drawback to former instruments is removed. It will be apparent from the last equation that regardless of source intensity and, what is more important, regardless of changes in spectral distribution of source intensity no spurious A.C. signal results. It should be noted that this complete insensitivity to the source requires only that the path cross sections be equal. If there is an unequal source intensity in the two paths, for example, by dirt on the windows, smoke in the exposed path which is a nonselective absorber and the like, there will be no A.C. signal provided that the filter curves are balanced. Changes in detector responsivity with aging will also not affect the null. They will, however, slightly affect the magnitude of an indication where there is some of the constituent to be measured present but the effect is so slight that this is normally of little consequence. Also, it is no problem to provide amplifiers with stable gains and similarly detectors such as thermistor bolometers with a high degree of stability are readily available.

The only case where a spurious A.C. signal could be produced is if there is both a shift in the transmission of one filter and a change in path geometry at the same time. The chances of this occurring are extremely remote and it should be noted that even in a rare instance where there is such an occurrence the effect is extremely small, for example, if by coincidence there were a 1% change in path geometry and a 1% change in filter transmission the effect would only be 0.01% whereas in a single path instrument such as was common in the past a 1% change in filter transmission would produce a 1% signal.

The above discussion brings out very clearly the extreme reliability of the instrument of the present invention. Even if the sensitivity of the instrument were no better than those which were available this would represent an enormous practical improvement. However, there is also present an extreme degree of sensitivity. This will be brought out in connection with the 8.2$\mu$ absorption band of acetone which lends itself readily to sensitivity measurements using standard available components namely a thermistor bolometer immersed in germanium and a time constant of 8 milliseconds with an infrared source of 2,000° K. An absorption in the exposed path of $4\times10^{-8}$ represents a practical sensitivity limit. In the case of acetone with a path length of one meter this represents the possibility of detecting an acetone concentration of $2\times10^{-10}$ gram per liter and thoroughly reliable results, allowing for a large safety factor, would be $1\times10^{-9}$ gram per liter.

The great sensitivity of the instrument has been illustrated in terms of acetone detection because this lends itself readily to computation. In practice, the detection of acetone is not the most important practical field of utility. A much more important practical use is the detection of very small amounts of hydrocarbon in the atmosphere as a result of incomplete combustion of gasoline in automobile engines. The present invention lends itself readily to a simple, relatively cheap, rugged instrument which can be used for testing excessive hydrocarbon content down far below acceptable tolerances even in cities such as Los Angeles where climatic conditions render smog production by unburnt hydrocarbons particularly critical. Other fields of utility are the detection of very small leaks particularly where the leakage is of toxic material. Similarly the detection of small amounts of toxic gases in the atmosphere in industry is very simple and the instruments of the present invention may be used as warnings in many chemical plants. Often the detection of a leak when it is very small is of prime importance as it is easier to eliminate it before the leak has become too great.

The invention will be described in greater detail in conjunction with the drawings in which.

Figure 1:
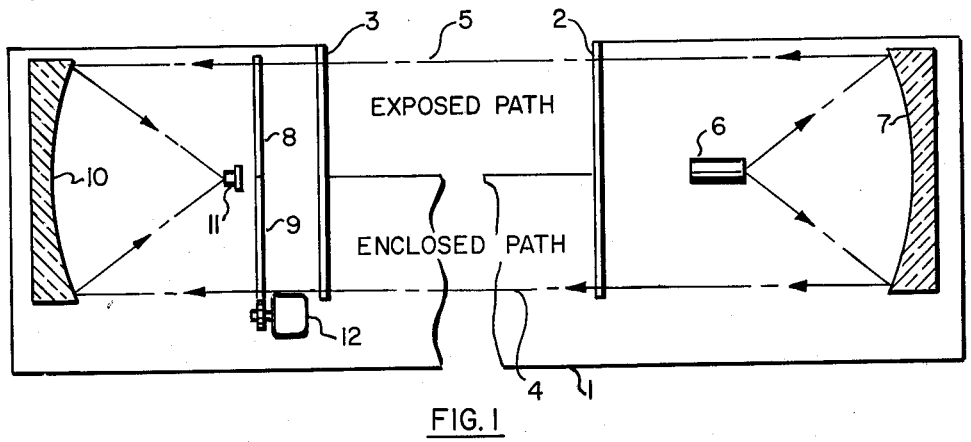
FIG. 1 is a semidiagrammatic section of an instrument using catoptric optics.

In FIG. 1 there is shown an instrument with a housing 1 provided with two windows 2 and 3 and with a portion of the tubing cut out so that two paths are presented, one an enclosed path 4 and, second, an exposed path 5.

At one end of the instrument there is a source of infrared radiation 6 with a collimating mirror 7. Two rays are shown, one going through the enclosed path and one through the exposed path. These rays, after passing through the window 3, pass through a rotating filter wheel composed of two semicircular filters 8 and 9. The wheel is driven by a small synchronous motor 12. The filters are chosen so that one of them passes a narrow infrared band within which there is a strong absorption band of the constituent which to to be detected in the exposed path. The other filter 9 passes a different band in the infrared which may advantageously be near that of filter 8 and which does not include absorption bands of any of the constituents in the atmosphere of the enclosed path. After passing through the filter wheel, the two beams are imaged on a detector 11 by a mirror 10. The output of the detector is connected to a conventional A.C. amplifier (not shown).

It will be seen that the geometry of the two paths is the same and that cross sections can be made equal. This calibration is easily effected by substituting for the filter wheel, FIG. 2, one which has opaque and transmitting semicircles. The cross section of the paths is then adjusted; for example, by slight movement of the optics, until no A.C. signal appears. The position of the optics or other adjusting means is then locked and the filter wheel of FIG. 2 substituted. The exposed path is then temporarily obscured and the instrument operated. If an A.C. signal results the filter section which shows the higher transmission is grayed, for example, by stippling with an opaque paint until the signal disappears. The instrument is then calibrated and, as has been pointed out above, operates reliably and maintains its null despite changes in source intensity, some spectral distribution, unequal source intensity in the two paths such as nonselective smoke in the exposed path, and changes in detector responsivity or amplifier gain. If the signal from the detector is led to a measuring instrument there will be a very slight change with varying detector responsivities and amplifier gains except at balance. This is ordinarily not sufficiently important to require expensive corrections by thermostating the detector or by using complex, completely drift compensated amplifiers.

Figure 2:
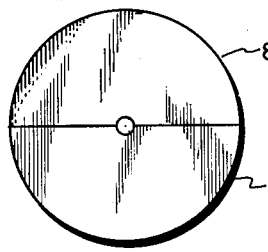
FIG. 2 is a plan view of the filter wheel in FIG. 1.
Figure 3:
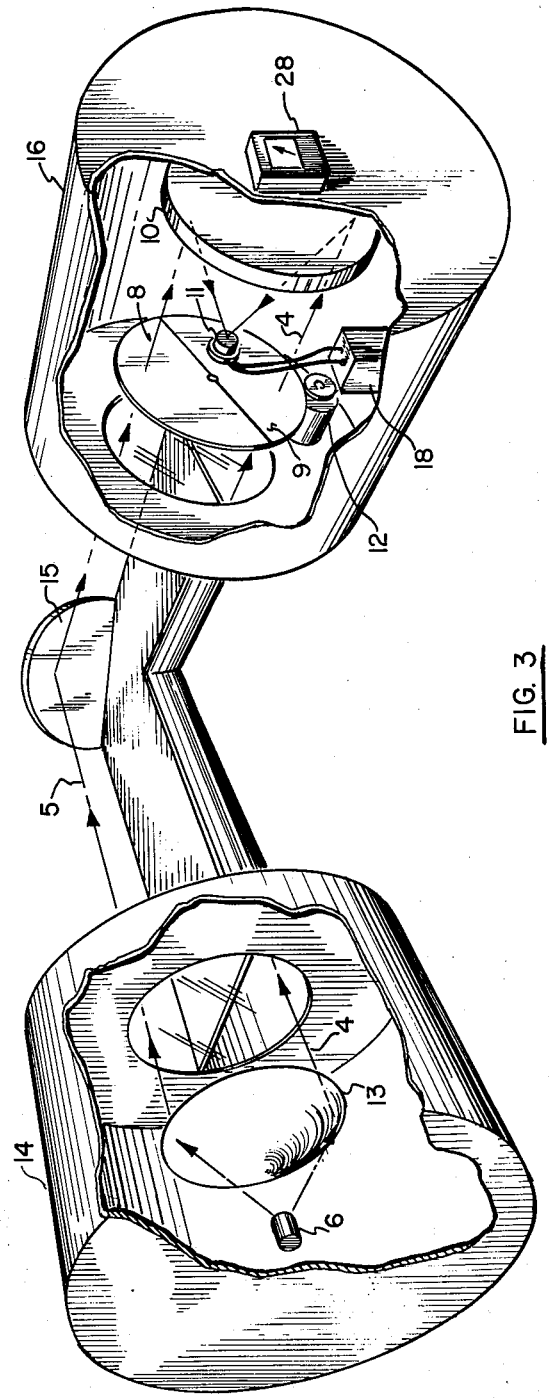
FIG. 3 is a perspective, partly broken away, of a folded instrument.

FIGS. 1 and 2 illustrate well the operation of the present invention; however, in order to achieve the extraordinary sensitivity which is possible with the present instrument it is necessary to provide for path lengths of reasonable lengths. For example, path length of one meter is suitable. Such an instrument, if of the form shown in FIG. 1, would be quite long with some loss in ruggedness. Therefore, a folded design, although it does not change the organization of the invention, represents some practical advantages. Such a design is shown in FIG. 3 where the same elements bear the same reference numerals. Here the housing has been modified to take the shape of a V. The path cross sections can be quite small; for example, about 2 inches, so that it is desirable to provide larger ends or bells 14 and 16. In the bell 14 which carries the source 6 a collimating lens 13, for example of germanium if infrared radiations longer than about 1.8$\mu$ are to be used, replaces the mirror in FIG. 1. Folding of the path, both enclosed and exposed, is effected by the folding mirror 15 at the apex of the V. The end 16 carries the collecting mirror 10 which is of the same design as in FIG. 1 and the detector 11 is as in FIG. 1. The filter wheel is in the bell 16 and rotates in the two paths as it does in the straight line instrument of FIG. 1. An amplifier 18 is mounted in the bell 16 and the end surface also carries a meter 28. The instrument may also carry a warning alarm such as a buzzer or bell of conventional design (not shown) which is adjusted to be actuated at a predetermined signal level.

Figure 5:
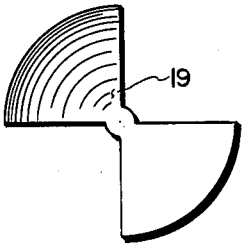
FIG. 5 is a plan view of the mirror in FIG. 4.
Figure 4:
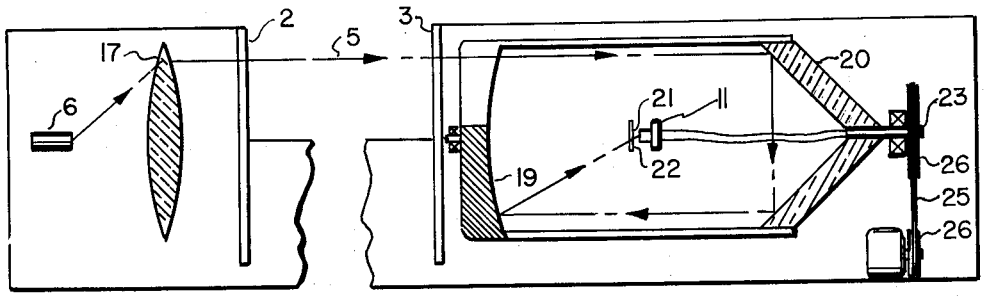
FIG. 4 is a section through a modified form of instrument with fixed filters.
Figure 6:
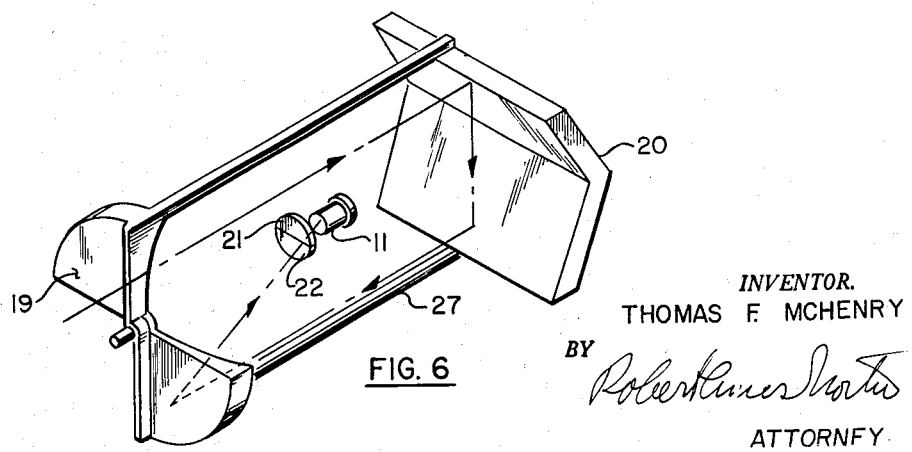
FIG. 6 is a perspective view of the instrument of FIG. 4.

In FIGS. 1 to 3 instruments have been shown in which there is a revolving filter wheel which effects chopping at the frequency which is handled by the amplifier. It is not necessary that moving filters be provided and an alternative is shown in FIGS. 4, 5 and 6 in which also the same parts bear the same reference numerals. In this modification a lens 17 replaces the collimating mirror 7. The paths of the beams through the enclosed and exposed sections are the same as in FIG. 1 as are the windows 2 and 3. However, instead of a filter wheel there is provided a mirror 19 with two quadrants cut out. This is shown clearly in the plan view in FIG. 5. Rays passing through the open sectors encounter a rotating right-angle pair of mirrors 20 driven by a motor 24 through the belt 25, pulleys 26 and a hollow shaft 23 through which output leads from the detector 11 pass. The three mirrors are mounted in a frame 27 and revolve as a unit. Two stationary filters, which can be very small and may form a part of the window of the detector, are shown at 21 and 22. One ray is shown coming through the top left-hand open quadrant of the mirror 19. It strikes one of the mirrors 20, is reflected to the other and then back to the mirror quadrant of the mirror 19. The mirror reflects the beam through one of the filters 21 onto the detector. As the mirror 20 rotates beams from the exposed and enclosed paths alternately pass through the two filters onto the detector and the same form of output signal results as in FIGS. 1 to 3.

The rotating mirror and fixed filters shown in FIG. 4 have the big advantage that the filters are quite small and they are fixed. This is only slightly offset by a reduction of sensitivity by a factor of two. However, the sensitivity in the instrument is so enormous that for many uses the modification of FIG. 4 is advantageous.

The rotating mirror pair 20 is illustrative of one of several known types of optical elements which perform the function. Another type is a totally reflecting prism. The mirrors are cheaper in the infrared but they require precise alignment and are somewhat less rugged than is a totally reflecting prism.

In general, in instruments of the present invention, the optics may be either catoptric or dioptric. In the modification of FIG. 1 either or both of the optics may be dioptric, of course with corresponding relocation of source and detector, but in the modification shown in FIG. 4 the use of a mirror 19 presents advantages. A similarly cut lens can, of course, be used but this is less simple to obtain.

I claim:
1. An infrared gas analyzer comprising in combination and in optical alignment,
   (a) a source of infrared radiation,
   (b) two paths, at least one of them being enclosed, said paths being of equal effective cross section and capable of having differing gas compositions,
   (c) means for forming beams from said infrared source and for directing them through said paths,
   (d) an infrared detector and two filtering means one of which passes a band of infrared radiation containing a strong absorption band of a predetermined chemical capable of existing in the vapor phase,
   (e) means for imaging the two beams alternately through each filter onto the detector at a predetermined alternating frequency and A.C. responsive indicating means connected to the output of said detector and responsive to the frequencies of said alternation of the beams.

2. An infrared gas analyzer according to claim 1 in which the transmission of the filters in both infrared bands is equal whereby, in the absence of the predetermined chemical compound in both of the paths, a zero A.C. signal is produced at the detector output.

3. An infrared gas analyzer according to claim 1 comprising a tubular container carrying the infrared source, the beam producing and imaging means, the detector, the filters and the alternating means, said tubular member having a portion intermediate the beam forming means and the other means cut out to define an exposed path, means separating the unenclosed path from the rest of the tubular element and defining an enclosed path and gas impervious infrared transmitting windows at the two ends of said unenclosed path.

4. An infrared gas analyzer according to claim 3 in which the transmission of the filters in both infrared bands is equal whereby, in the absence of the predetermined chemical compound in both of the paths, a zero A.C. signal is produced at the detector output.

5. An infrared gas analyzer according to claim 1 in which the filtering and alternating means comprise a rotating filter wheel driven at alternation frequency.

6. An infrared gas analyzer according to claim 5 in which the transmission of the filters in both infrared bands is equal whereby, in the absence of the predetermined chemical compound in both of the paths, a zero A.C. signal is produced at the detector output.

7. An infrared gas analyzer according to claim 1 in which the filtering means are fixed filters and the alternating means comprises means for rotating the beams from the two paths alternately through the fixed filters and onto the detector.

8. An infrared gas analyzer according to claim 7 in which the transmission of the filters in both infrared bands is equal whereby, in the absence of the predetermined chemical compound in both of the paths, a zero A.C. signal is produced at the detector output .

9. An infrared gas analyzer according to claim 3 in which the tubular member is folded and reflecting means is provided reflecting infrared beams in both paths uniformly through both portions of the tubular member.

10. An infrared gas analyzer according to claim 9 in which the transmission of the filters in both infrared bands is equal whereby, in the absence of the predetermined chemical compound in both of the paths, a zero A.C. signal is produced at the detector output.

References Cited in the file of this patent
UNITED STATES PATENTS

| | | |
|---|---|---|
| 1,746,525 | Darrah | Feb. 11, 1930 |
| 1,999,023 | Sharp et al. | Apr. 23, 1935 |
| 2,547,212 | Jamison et al. | Apr. 3, 1951 |
| 2,692,950 | Wallace | Oct. 26, 1954 |
| 2,775,160 | Foskett et al. | Dec. 25, 1956 |
| 2,999,937 | Kohler | Sept. 12, 1961 |
| 3,009,065 | McKnight et al. | Nov. 14, 1961 |